United States Patent
Wu et al.

(10) Patent No.: US 12,088,870 B2
(45) Date of Patent: Sep. 10, 2024

(54) VIDEO PLAYING METHOD AND APPARATUS, DEVICE, AND STORAGE MEDIUM

(71) Applicant: Beijing Bytedance Network Technology Co., Ltd., Beijing (CN)

(72) Inventors: Shuna Wu, Beijing (CN); Dong An, Beijing (CN); Hao Qiu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/468,049

(22) Filed: Sep. 15, 2023

(65) Prior Publication Data
US 2024/0007702 A1    Jan. 4, 2024

Related U.S. Application Data

(63) Continuation of application No. PCT/CN2022/078710, filed on Mar. 2, 2022.

(30) Foreign Application Priority Data

Mar. 18, 2021 (CN) .......................... 202110291842.7

(51) Int. Cl.
 *H04N 21/43* (2011.01)
 *H04N 21/431* (2011.01)
 *H04N 21/482* (2011.01)

(52) U.S. Cl.
 CPC ..... *H04N 21/4312* (2013.01); *H04N 21/4825* (2013.01)

(58) Field of Classification Search
None
See application file for complete search history.

(56) References Cited

U.S. PATENT DOCUMENTS 5,805,165 A * 9/1998 Thorne, III ............. G06F 3/038
                                                     715/823
9,686,583 B2 * 6/2017 Ito ....................... H04N 21/4221
(Continued)

FOREIGN PATENT DOCUMENTS

CN    105791947 A    7/2016
CN    105847938 A    8/2016
(Continued)

OTHER PUBLICATIONS

First Office Action and Search Report in CN202110291842.7, mailed Jun. 14, 2022, 7 pages.
(Continued)

*Primary Examiner* — Mushfikh I Alam
(74) *Attorney, Agent, or Firm* — Astute IP Law Group

(57) ABSTRACT

Embodiments of the present disclosure relate to a video playing method and apparatus, a device, and a storage medium. The method includes: displaying a plurality of videos in a form of rows and columns in a first page, a column direction being consistent with a slide direction supported by the page; determining a first target video reaching a corresponding predetermined control line of predetermined control lines among videos in a to-be-played row in response to a trigger operation, the predetermined control lines being in correspondence with the columns in the first page, the predetermined control lines being arranged at intervals along the column direction; and stopping playing of a second target video that is being played in the first page, and playing the first target video in the first page.

19 Claims, 5 Drawing Sheets

(56) References Cited

U.S. PATENT DOCUMENTS

| | | | |
|---|---|---|---|
| 9,767,845 B2 | 9/2017 | McIntosh et al. | |
| 10,298,874 B1 | 5/2019 | Lewis et al. | |
| 10,579,220 B2* | 3/2020 | Drouin | H04N 21/854 |
| 10,664,222 B2 | 5/2020 | Miller et al. | |
| 2004/0070593 A1* | 4/2004 | Neely | H04N 1/00458 |
| | | | 707/E17.028 |
| 2010/0304731 A1* | 12/2010 | Bratton | H04N 23/695 |
| | | | 348/E5.042 |
| 2012/0110623 A1* | 5/2012 | Hill | H04N 21/4828 |
| | | | 725/53 |
| 2013/0019147 A1 | 1/2013 | Chand | |
| 2014/0223307 A1* | 8/2014 | McIntosh | H04N 21/47217 |
| | | | 715/719 |
| 2014/0373057 A1* | 12/2014 | Hoffert | H04N 21/4312 |
| | | | 725/100 |
| 2016/0334973 A1* | 11/2016 | Reckhow | H04N 21/4312 |
| 2016/0345052 A1 | 11/2016 | Wang et al. | |
| 2017/0026577 A1* | 1/2017 | You | H04N 5/9201 |
| 2017/0244775 A1* | 8/2017 | Ha | H04N 21/00 |
| 2018/0302683 A1* | 10/2018 | Lu | H04N 21/47205 |

FOREIGN PATENT DOCUMENTS

| | | |
|---|---|---|
| CN | 107948740 A | 4/2018 |
| CN | 108984081 A | 12/2018 |
| CN | 110636355 A | 12/2019 |
| CN | 111970566 A | 11/2020 |
| CN | 112423084 A | 2/2021 |
| CN | 112423122 A | 2/2021 |
| CN | 112954442 A | 6/2021 |
| WO | 2014082303 A1 | 6/2014 |
| WO | 2017181594 A1 | 10/2017 |

OTHER PUBLICATIONS

International Search Report in PCT/CN2022/078710, mailed May 19, 2022, 3 pages.
Second Office Action in CN202110291842.7, mailed Feb. 13, 2023, 5 pages.
Notice of Decision of Granting Patent Right for Invention in CN202110291842.7, mailed Jun. 19, 2023, 1 page.
Extended European Search Report for European Patent Application No. 22770301.4, mailed Jun. 5, 2024, 8 pages.

* cited by examiner

VIDEO PLAYING METHOD AND APPARATUS, DEVICE, AND STORAGE MEDIUM

CROSS-REFERENCE TO RELATED APPLICATIONS

The present application is a continuation of International Application No. PCT/CN2022/078710, filed on Mar. 2, 2022, which claims priority to the Chinese patent application No. 202110291842.7 entitled "VIDEO PLAYING METHOD AND APPARATUS, DEVICE, AND STORAGE MEDIUM" and filed on Mar. 18, 2021, both of which are incorporated herein by reference.

TECHNICAL FIELD

The present disclosure relates to the technical field of image processing, in particular to a video playing method and apparatus, a device, and a storage medium.

BACKGROUND

For a plurality of columns of videos in a scene such as video search and video display, some dynamic playing schemes currently exist. Dynamic playing here refers to automatically switching playing when videos in a page satisfy certain conditions (such as user sliding, video playing time reaching, etc.) during user browsing.

In an existing dynamic playing scheme, playing of the next video whenever can be triggered in response to a slide operation of the user. However, in this scheme, the user may simply want to move the video to a more comfortable visual area to continue the viewing rather than want to see the next video. In another dynamic playing scheme, with the slide operation of the user, only part of the video in the page can be played, reducing the attention to the unplayed video in the page. In another dynamic playing scheme, two columns of videos are included, a user slide operation will trigger playing of videos on one side, and the video on the other side can only be played after the playing of the video on the one side is finished.

In summary, the existing dynamic playing schemes for a plurality of columns of videos cannot accurately control the automatic playing and stopping of videos in a page, resulting in playing chaos of a plurality of columns of videos, the problem that the area where the video is being played cannot be positioned in a suitable visual area in the whole screen, the problem that the user operation causes the mis-playing of non-target videos, etc.

SUMMARY

To solve the above technical problems, or at least partially solve the above technical problems, the present disclosure provides a video playing method and apparatus, a device, and a storage medium.

An embodiment of the present disclosure provides a video playing method, including: displaying a plurality of videos in a form of rows and columns in a first page, a column direction being consistent with a slide direction supported by the page; determining a first target video reaching a corresponding predetermined control line of predetermined control lines among videos in a to-be-played row in response to a trigger operation, the predetermined control lines being in correspondence with the columns in the first page, the predetermined control lines being arranged at intervals along the column direction; and stopping playing of a second target video that is being played in the first page, and playing the first target video in the first page.

An embodiment of the present disclosure provides a video playing apparatus, including: a video displaying module configured to display a plurality of videos in a form of rows and columns in a first page, a column direction being consistent with a slide direction supported by the page; a first target video determination module configured to determine a first target video reaching a corresponding predetermined control line of predetermined control lines among videos in a to-be-played row in response to a trigger operation, the predetermined control lines being in correspondence with the columns in the first page, the predetermined control lines being arranged at intervals along the column direction; and a first target video playing module configured to stop playing of a second target video that is being played in the first page, and play the first target video in the first page.

An embodiment of the present disclosure further provides an electronic device including a processor and a memory. The processor is configured to execute steps of video playing method of any embodiment of the present disclosure by calling a program or instruction stored in the memory.

An embodiment of the present disclosure further provides a computer-readable storage medium having a program or instruction stored therein. the program or instruction is configured to cause a computer to execute steps of the video playing method of any embodiment of the present disclosure.

A video playing scheme provided by an embodiment of the present disclosure includes: displaying a plurality of videos in a form of rows and columns in a first page, a column direction being consistent with a slide direction supported by the page; determining a first target video reaching a corresponding predetermined control line of predetermined control lines among videos in a to-be-played row in response to a trigger operation, the predetermined control lines being in correspondence with the columns in the first page, the predetermined control lines being arranged at intervals along the column direction; and stopping playing of a second target video that is being played in the first page, and playing the first target video in the first page. This achieves that a plurality of predetermined control lines is set in the page in advance, and in the trigger operation process, these predetermined control lines are constantly used to respectively control the playing and stopping of videos in a row perpendicular to the slide direction, improving the accuracy of the control of the playing and stopping of each video in the dynamic presentation process of a plurality of columns of videos, and solving the problem of the playing chaos of a plurality of columns of videos, the problem that the area where the video is being played cannot be positioned in a suitable visual area in the screen, the problem that the user operation causes the mis-playing of non-target videos, etc., improving the user experience.

BRIEF DESCRIPTION OF DRAWINGS

The drawings herein are incorporated into the description to form a part of the description, show embodiments in conformity with the present disclosure, and are used together with the description to explain the principles of the present disclosure.

In order to illustrate the embodiments of the present disclosure or the technical solutions in the related art more clearly, the following will briefly introduce the drawings that need to be used in the description of the embodiments or the related art. Apparently, for those of ordinary skills in the art, other drawings can be obtained according to these drawings without involving inventive efforts.

DESCRIPTION OF EMBODIMENTS

In order to better understand the above objectives, features, and advantages of the present disclosure, the following will further describe the schemes of the present disclosure in detail. It should be noted that the embodiments and features of the embodiments of the present disclosure can be combined with each other without conflicts.

Many specific details have been elaborated in the following description to facilitate a full understanding of the present disclosure, but the present disclosure can also be implemented in other ways different from those described here; apparently, the embodiments in the description are only part of the embodiments of the disclosure, rather than all the embodiments.

The video playing method provided by the embodiments of the present disclosure is mainly applicable to a scene in which a plurality of rows or a plurality of columns of videos is dynamically played. The video playing method provided by the embodiments of the present disclosure can be executed by a video playing apparatus. The apparatus can be implemented by means of software and/or hardware, and can be integrated into an electronic device having a video playing function, such as a mobile phone, a palmtop computer, a tablet computer, a notebook computer, or a desktop computer.

Figure 1:
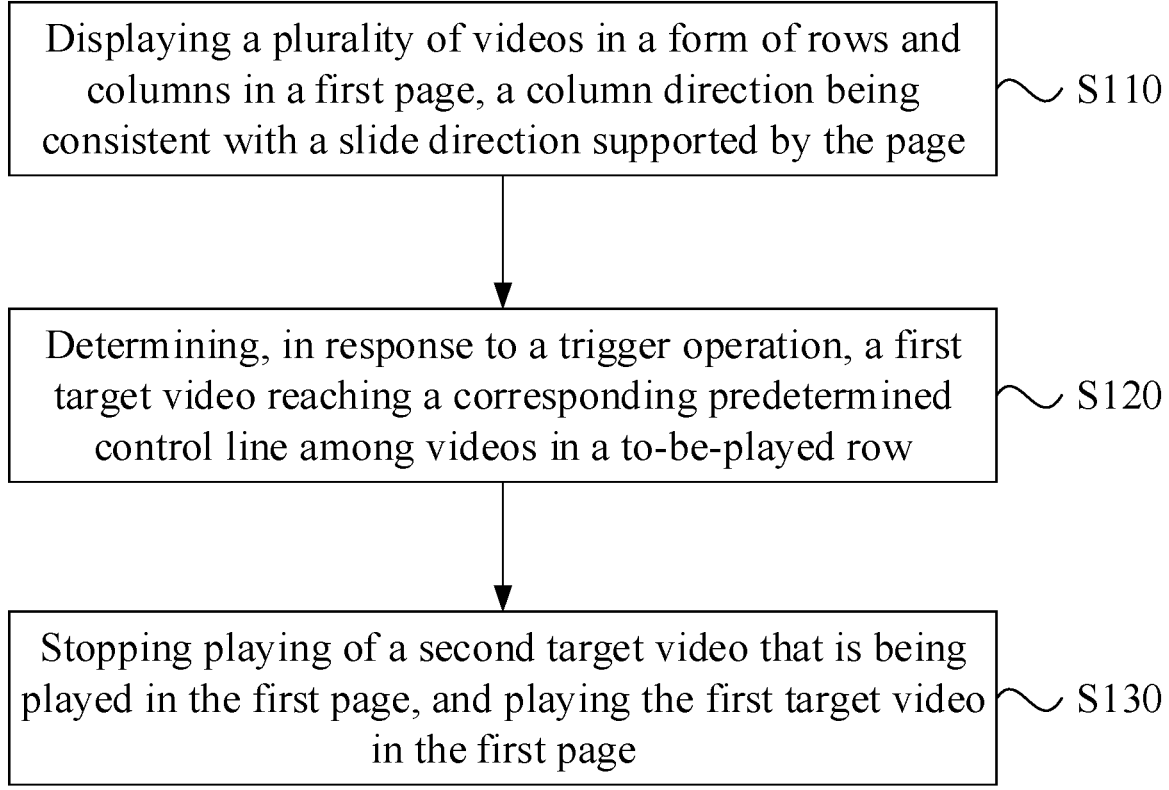
FIG. 1 is a schematic flow diagram of a video playing method provided in an embodiment of the present disclosure.

FIG. 1 is a flow diagram of a video playing method provided in an embodiment of the present disclosure. With reference to FIG. 1, the video playing method specifically includes the following operations at blocks S110 to S130:

At S110, a plurality of videos is displayed in a form of rows and columns in a first page. Here, a column direction is consistent with a slide direction supported by the page.

In particular, a first page is loaded for presentation to a user, and a plurality of videos is displayed in a form of rows and columns in the first page. In some embodiments, the first page is a recommendation page, a video vertical page, a search result page, a follow page, etc. for different types of videos, such as short videos and live streaming.

Figure 2:
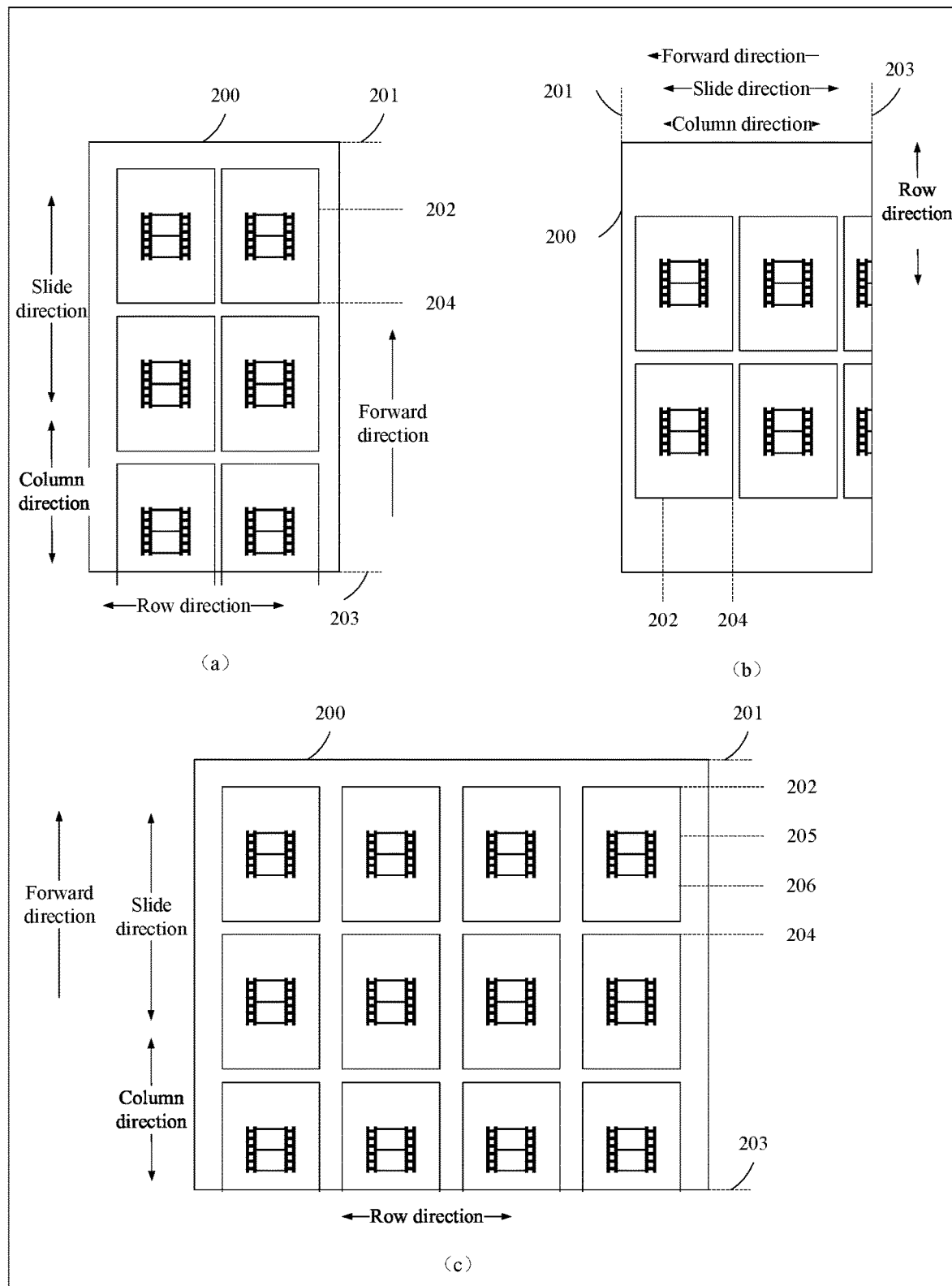
FIG. 2 is a schematic diagram of the layout of a plurality of videos in a video playing page provided by an embodiment of the present disclosure.

Referring to FIG. 2, a plurality of videos arranged in rows and columns is laid out in the first page 200, and the number of rows and the number of columns are not smaller than 2. Referring to FIG. 2 (a), the videos are laid out in a vertical direction in the first page 200, with both the column direction and the slide direction being the vertical direction and the row direction being a horizontal direction. Referring to FIG. 2 (b), the videos are laid out in a horizontal direction in the first page 200, with both the column direction and the slide direction being the horizontal direction and the column direction being a vertical direction. Whether the layout direction of the videos is the horizontal direction or the vertical direction, the slide direction of the videos in the first page is consistent with the column direction, with the same video play control logics based on predetermined control lines. The following embodiments will be described by taking the vertical layout in FIG. 2 (a) as an example.

In some embodiments, the operation at S110 includes: receiving video search information of a user; determining a plurality of videos corresponding to the video search information; and playing the plurality of videos in the form of rows and columns in the first page. In this embodiment, the first page may be a video search result page, and a plurality of videos is determined based on a user's video search operation. In particular, a user may initiate a video search by entering a search keyword at a search position, or triggering a certain recommendation keyword, etc. The video search engine may receive information such as the above-mentioned search keyword or recommendation keyword as video search information. Then, the video search engine is triggered based on the video search information to obtain a response result of the video search, namely, a plurality of videos corresponding to the video search information. Finally, a plurality of videos is presented in rows and columns in the first page. It needs to be noted that the video search engine can be integrated into an electronic device or in a server.

At S120, a first target video reaching a corresponding predetermined control line of predetermined control lines among videos in a to-be-played row is determined in response to a trigger operation.

The predetermined control lines are in correspondence with the columns in the first page, and the predetermined control lines are arranged at intervals along the column direction for the trigger operation.

The trigger operation refers to an interactive operation of a user on a page, which may be a slide operation, a click operation, or a voice control operation, etc. The to-be-played row refers to a row where the currently played video is located, or the next row of the currently played video. If no video is currently played, the first row of the videos is the to-be-played row. The predetermined control lines are in correspondence with the columns in the first page, and the predetermined control lines are arranged at intervals along the column direction. In order to accurately control the playing and stopping of videos in the first page, in the embodiments of the present disclosure, a plurality of predetermined control lines is predetermined according to the number of columns of videos laid out in the first page, and each predetermined control line is used for controlling the playing and stopping of at least one column of videos. It should be noted that the predetermined control lines are provided in the backend for controlling the video dynamic playing, are not displayed in the first page, and are not visible to the user.

In some embodiments, in order to more precisely control the playing and stopping of each video in the first page, the same number of predetermined control lines as the number of columns of videos laid out in the first page may be set, i.e. the number of predetermined control lines is the same as the number of columns of videos contained in the first page. Further, the predetermined control lines are in one-to-one correspondence with the columns of videos, namely, each predetermined control line can control the playing and stopping of one column of videos. As shown in FIG. 2 (*a*) and FIG. 2 (*b*), if the videos in the first page are in double columns, the number of predetermined control lines is two, namely, a first predetermined control line 202 adjacent to a starting position 201 of the first page 200 and a second predetermined control line 204 adjacent to an end position 203 of the first page 200. As shown in FIG. 2 (*c*), if the videos in the first page are in four columns, the number of predetermined control lines is four, namely, a first predetermined control line 202, a third predetermined control line 205, a fourth predetermined control line 206, and a second predetermined control line 204. It needs to be noted that the arrangement interval between the predetermined control lines may be set according to business requirements. As shown in FIG. 2 (*c*), the predetermined control lines may be arranged in the upper half of the first page 200 at equal intervals. As shown in FIG. 2 (*a*), the predetermined control lines may be arranged in the upper half of the first page 200 at unequal intervals.

In some embodiments, positions of the predetermined control lines in the first page are determined based on video lengths of the videos in the column direction and a length of the first page in the column direction. In order to play the video in a suitable visual area of the screen of the electronic device, it is necessary in this embodiment to determine the set position of each of the predetermined control lines in the first page based on the video lengths of the videos and the length of the first page in the column direction. For example, for the vertical double-column videos shown in FIG. 2 (*a*), a corresponding first predetermined control line 202 is set at a position approximately at ¼ of a top video, and a second predetermined control line 204 is set at a position approximately at the bottom edge of the top video.

Specifically, after the first page is loaded, if the user performs a trigger operation on the first page, the video playing apparatus may detect the trigger operation. Then, whether each video in the to-be-played row reaches its corresponding predetermined control line is determined based on he trigger operation and the predetermined control lines. If so, the video reaching the corresponding predetermined control line is determined as the first target video. The video that does not reach the corresponding predetermined control line is not processed.

At S130, playing of a second target video that is being played in the first page is stopped, and the first target video is played in the first page.

Specifically, after the first target video is determined, it is necessary to play the first target video. At this time, the playing of the video that is being played in the first page (i.e., the second target video) is stopped and playing of the first target video is started.

In some embodiments, playing the first target video in the first page includes: playing, when the at least one first target video includes one, the one first target video in the first page; and determining, when the at least one first target video includes a plurality of first target videos, a last first target video among the plurality of first target videos in an opposite direction of the operation direction based on an operation direction of the trigger operation, and playing the determined first target video in the first page. Specifically, if the plurality of predetermined control lines is set at a small interval, it may result in a case where a plurality of videos reaches corresponding predetermined control lines at the same time (i.e. a plurality of videos is determined to be the first target video at the same time). In conjunction with the business requirement of playing only one video at a same time, the first target video will be further processed before being played in this embodiment. If the first target video is one video, then the playing of the target video begins. If the first target video is a plurality of videos, the last first target video that is opposite to the operation direction of the triggered operation is selected from the plurality of first target videos, and the selected last target video is played. For example, if the slide direction of the first page is an upward or downward vertical direction, and the operation direction of the trigger operation is an upward sliding (the video in the page moves upward), then when there is a plurality of first target videos, the lowermost first target video is played.

In some embodiments, the method further includes, subsequent to the operation at S130: determining a third target video reaching a corresponding predetermined control line among the videos in response to another trigger operation, stopping playing of the first target video, and playing the third target video in the first page.

Specifically, after the responding to one trigger operation is finished and the first target video is played, if the user continues to conduct a trigger operation, the video playing apparatus continues to respond to the trigger operation of the user according to the execution process of S120 to S130, determines a new first target video, namely, the third target video, and then stops playing of the first target video and starts playing the third target video.

The above-mentioned technical solution of the embodiments of the present disclosure includes: displaying a plurality of videos in a form of rows and columns in a first page, a column direction being consistent with a slide direction of the page; determining a first target video, reaching a corresponding predetermined control line of predetermined control lines, among videos in a to-be-played row in response to a trigger operation, the predetermined control lines being in correspondence with the columns in the first page, the predetermined control lines being arranged at intervals along the column direction; and stopping playing of a second target video that is being played in the first page, and playing the first target video in the first page. In this way, a plurality of predetermined control lines is set in the page in advance, and in the trigger operation process, these predetermined control lines are constantly used to respectively control the playing and stopping of videos in a row perpendicular to the slide direction, which improves the accuracy of the control of the playing and stopping of each video in the dynamic presentation process of a plurality of columns of videos, and solves the problem of the playing chaos of a plurality of columns of videos, the problem that the area where the video is being played cannot be positioned in a suitable visual area in the screen, the problem that the user operation causes the mis-playing of non-target videos, etc., thereby improving the user experience.

Figure 3:
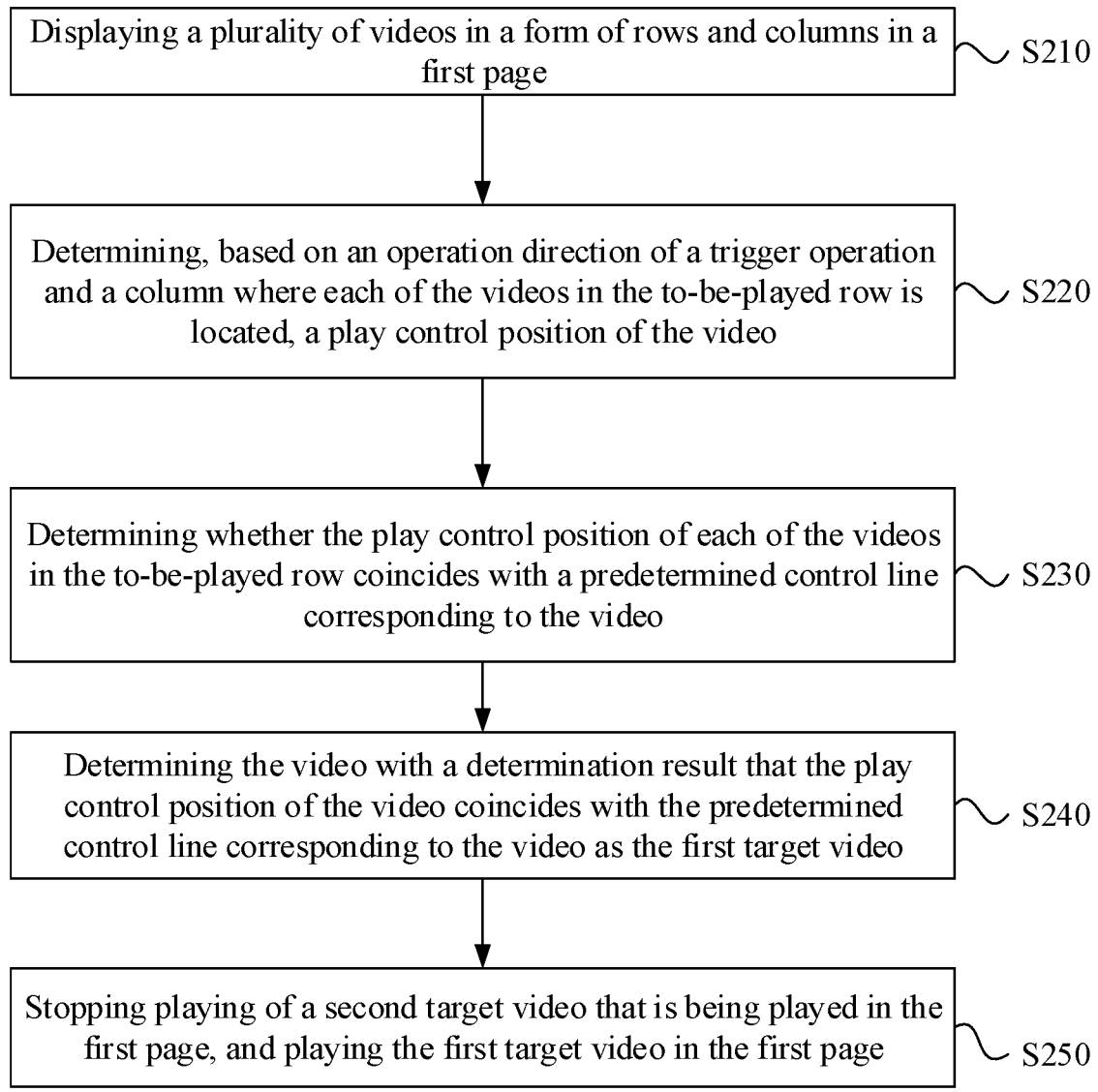
FIG. 3 is a schematic flow diagram of another video playing method provided by an embodiment of the present disclosure.

FIG. 3 is a flow diagram of another video playing method provided in an embodiment of the present disclosure. This video playing method further optimizes the operation of "determining the first target video, reaching the corresponding predetermined control line of the predetermined control lines, of the videos in the to-be-played row in response to detecting the trigger operation". The explanations of the terms identical to or corresponding to those in the above embodiments are not repeated herein. With reference to FIG. 3, the video playing method includes operations at blocks S210 to S250.

At S210, a plurality of videos is displayed in a form of rows and columns in a first page.

At S220, a play control position of each of videos in a to-be-played row is determined based on an operation direction of the trigger operation and a column where the video is located.

The play control position is a position in a video, and is a position to be reached by a predetermined control line corresponding to the video during control of the playing of the video.

Specifically, in the embodiment of the present disclosure, the control logic of the predetermined control line for the video of its corresponding column is that if the play control position of the video coincides with the predetermined control line, then the video is considered to reach the predetermined control line. Therefore, the play control position of each video is determined before the play control is performed using the predetermined control lines. Considering that when the operation direction of the trigger operation and the slide direction supported by the page have a different relationship (consistent or opposite), the playing order of the videos is different, and then the control order and the control positions of the predetermined control lines are also different. Therefore, in the embodiment of the present disclosure, the operation direction, the slide direction, and the column where the video is located are used to determine the play control position of the corresponding video.

In some embodiments, the operation at S220 includes: determining a top edge of each of the videos in the to-be-played row as a play control position of the video, when the operation direction of the trigger operation is a forward direction of the slide direction.

Here, as shown in FIG. 2, the forward direction is a direction from an end position 203 of the first page to a starting position 201 of the first page 200. For example, the forward direction in FIG. 2 (a) is the direction of upward sliding (the video in the page moves upward). The forward direction in FIG. 2 (b) is the direction of sliding to the left (the video in the page moves to the left). The top edge of the video is a side edge of the video adjacent to the starting position 201 of the first page 200.

Specifically, taking the slide direction as a vertical direction as an example, if a user performs a trigger operation in a forward direction on the first page, the play control logic of the predetermined control lines is that videos in the to-be-played row are triggered to play sequentially from the left column of the page to the right column of the page. Further considered is that the predetermined control lines are arranged at intervals from the starting position to the end position of the first page, and each of the predetermined control lines is adjacent to the starting position of the page. Therefore, in order to control the video to be played in a suitable visual area, the top edge of each video in the to-be-played row is determined as the play control position of the video in the present embodiment.

In some embodiments, the operation at S220 includes: determining a bottom edge of a video of the videos in the to-be-played row located in the rightmost column of the page as a play control position of the video, and a top edge of each remaining video of the to-be-played row as a play control position of the remaining video, when the operation direction of the trigger operation is a backward direction of the slide direction.

The backward direction is opposite to the forward direction, and is a direction from the starting position to the end position of the first page. The bottom edge is a side edge of the video adjacent to the end position.

Specifically, taking the slide direction as a vertical direction as an example, if a user performs a trigger operation in a backward direction on the first page, the play control logic of the predetermined control lines is that the videos in the to-be-played row are triggered to play sequentially from the right column of the page to the left column of the page. Further considered is that the predetermined control lines are arranged at intervals from the starting position to the end position of the first page, and each of the predetermined control lines is adjacent to the starting position of the page. Therefore, in order to control the video to be played in a suitable visual area, in the present embodiment, the bottom edge of a video in the to-be-played row and the rightmost column of the first page is determined as the play control position of the video, and the video is firstly triggered to be played when an operation in the backward direction is performed. For each remaining video in the to-be-played row, the top edge of the remaining video is determined as a play control position of the remaining video.

At S230, whether the play control position of each of the videos in the to-be-played row coincides with the predetermined control line corresponding to the video is determined.

Specifically, in the play control logic, in addition to determining the video play position of each video, the correspondence between the predetermined control lines and the columns also needs to be determined in order to correctly control the playing and stopping of the videos.

With regard to the case where the operation direction is a forward direction, the correspondence between the videos in the to-be-played row and the predetermined control lines is that: the videos in the to-be-played row from a left column of the page to a right column of the page sequentially correspond to the predetermined control lines from adjacent to the end position to adjacent to the starting position. As shown in FIG. 2, videos in double columns are laid out in the first page 200, and two predetermined control lines are provided, namely, a first predetermined control line 202 adjacent to the starting position 201 of the first page 200 and a second predetermined control line 204 adjacent to the end position 203 of the first page 200. Referring again to FIG. 2 (a) as an example, the first predetermined control line 202 positioned higher is used to control the play of the videos in the right column, and the second predetermined control line 204 positioned lower is used to control the play of the videos in the left column. Based on this, in response to a trigger operation of a user in the forward direction, whether the top edge of the video in the to-be-played row and the left column coincides with the second predetermined control line 204 is determined, and whether the top edge of the video in the to-be-played row and the right column coincides with the first predetermined control line 202 is determined.

With regard to the case where the operation direction is the backward direction, a correspondence between the videos in the to-be-played row and the predetermined control lines is that: a video in the rightmost column of the page corresponds to a predetermined control line closest to the end position; and the remaining videos from a left column of the page to a right column of the page sequentially correspond to remaining predetermined control lines from adjacent to the end position to adjacent to the starting position. Referring to FIG. 2 (a) as an example, the first predetermined control line 202 positioned higher is used to control the play of the videos in the left column, and the second predetermined control line 204 positioned lower is used to control the play of the videos in the right column. Based on this, in response to a trigger operation of a user in the backward direction, whether the bottom edge of the video in the to-be-played row and the right column coincides with the second predetermined control line 202 is determined, and whether the top edge of the video in the to-be-played row and the left column coincides with the first predetermined control line 204 is determined.

At S240, the video with a determination result that the play control position of the video coincides with the predetermined control line corresponding to the video is determined as a first target video.

Specifically, as to the determinment as to whether the play control position of each of the videos in the to-be-played row coincides with the predetermined control line corresponding to the video at S230, if the determinment result is that the play control position of the video coincides with the predetermined control line corresponding to the video, the video is determined as the first target video.

S250, playing of a second target video that is being played in the first page is stopped, and the first target video is played in the first page.

Figure 4:
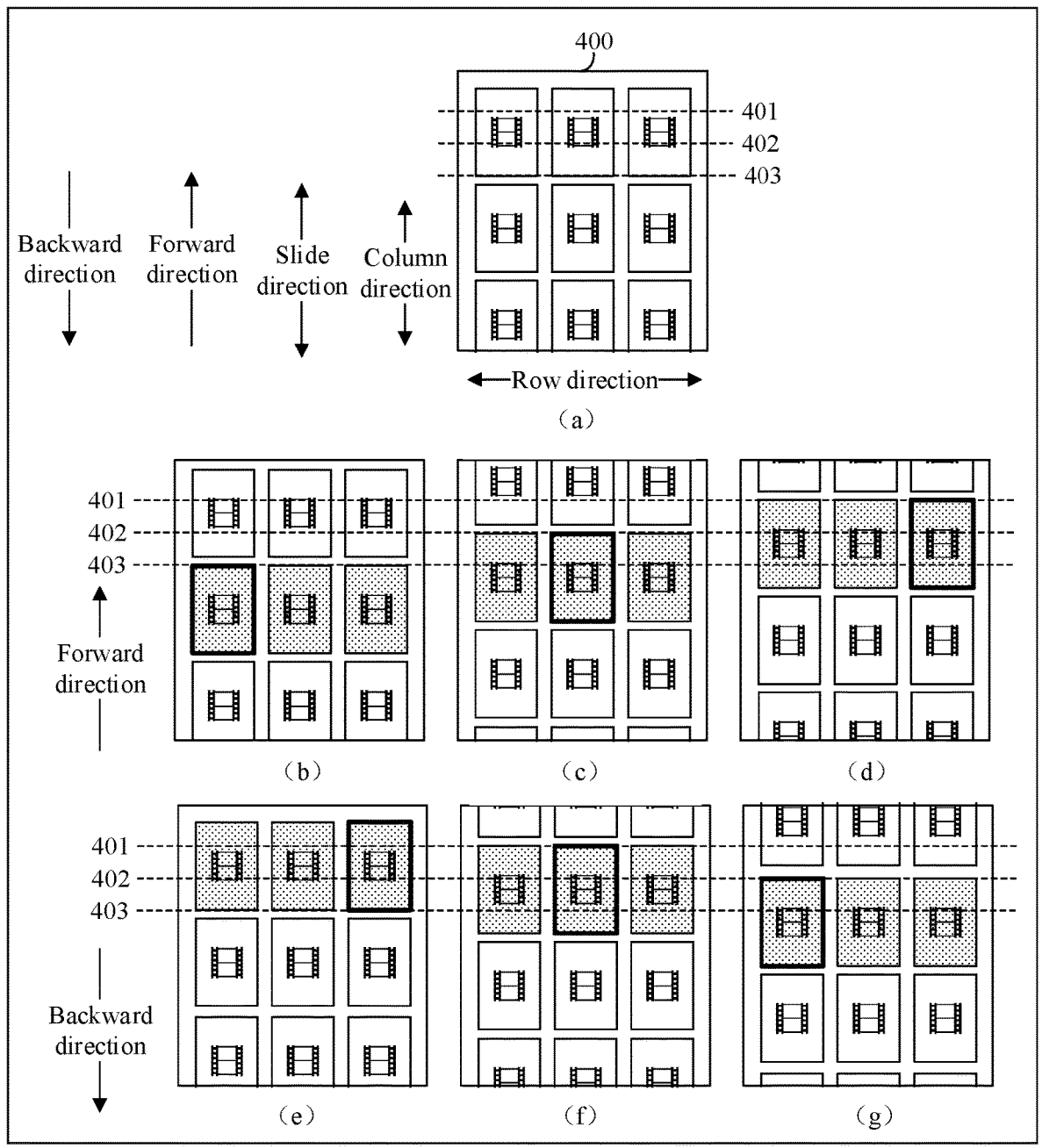
FIG. 4 is a schematic diagram of a play control process of predetermined control lines when three columns of videos slide in a forward direction and in a backward direction according to an embodiment of the present disclosure.

Referring to FIG. 4 (a), videos in the first page 400 are vertically arranged in three columns, and the slide direction supported by the first page 400 is an up-down direction. Then, three predetermined control lines are arranged in the first page 400, which are a first predetermined control line 401, a second predetermined control line 402, and a third predetermined control line 403 from top to bottom in sequence; the forward direction of the user's trigger operation is an upward direction, and the backward direction is a downward direction.

With reference to FIGS. 4 (b) to 4 (d), the trigger operation is in the forward direction, and the to-be-played row is the second row; the first predetermined control line 401 is used for controlling the leftmost column of videos, the second predetermined control line 402 is used for controlling the middle column of videos, and the third predetermined control line 403 is used for controlling the rightmost column of videos; the play control logic based on the predetermined control lines is embodied as follows: after a user executes a trigger operation, as shown in FIG. 4 (b), the top edge of the video in the second row and the leftmost column first coincides with the third predetermined control line 403, and then the video in the second row and the leftmost column is determined to be the first target video for playing while stopping the video in the first row that is being played. Continuing to respond to the trigger operation, as shown in FIG. 4 (c), as videos move upwards, the top edge of the video in the second row and the middle column coincides with the second predetermined control line 402, and then the video in the second row and the middle column is determined as the first target video for playing while stopping the playing of the video in the second row and the leftmost column. Continuing to respond to the trigger operation, as shown in FIG. 4 (d), as videos continue to move upwards, when the top edge of the video in the second row and the rightmost column coincides with the first predetermined control line 401, the video in the second row and the rightmost column is determined as the first target video for playing while stopping the playing of the video in the second row and the middle column.

With reference to FIGS. 4 (e) to 4 (g), the trigger operation is in the backward direction, and the to-be-played row is a topmost row of the page in FIG. 4 (e); the first predetermined control line 401 is used for controlling the middle column of videos, the second predetermined control line 402 is used for controlling the leftmost column of videos, and the third predetermined control line 403 is used for controlling the rightmost column of videos; the play control logic based on the predetermined control lines is embodied as follows: when the user executes a trigger operation, as shown in FIG. 4 (e), the bottom edge of the video in the to-be-played row and the rightmost column first coincides with the third predetermined control line 403, and then the video in the to-be-played row and the rightmost column is determined to be the first target video for playing while stopping other videos being played. Continuing to respond to the trigger operation, as shown in FIG. 4 (f), as videos move downwards, the top edge of the video in the to-be-played row and the middle column coincides with the first predetermined control line 401, and then the video in the to-be-played row and the middle column is determined to be the first target video for playing while stopping the playing of the video in the to-be-played row and the rightmost column. Continuing to respond to the trigger operation, as shown in FIG. 4 (g), as videos continue to move downwards, the top edge of the video in the to-be-played row and the leftmost column coincides with the second predetermined control line 402, and then the video in the to-be-played row and the leftmost column is determined to be the first target video for playing while stopping the playing of the video in the to-be-played row and the middle column.

The above-mentioned technical solution of the embodiments of the present disclosure determines a play control position of each of the videos in the to-be-played row based on the operation direction of the trigger operation and the column where the video is located; determines whether the play control position of each of the videos in the to-be-played row coincides with a predetermined control line corresponding to the video; and determines the video with a determination result that the play control position of the video coincides with the predetermined control line corresponding to the video as the first target video. When the trigger operation of a user is a forward operation or a reverse operation, various predetermined control lines are used to control the play of the videos by using different control strategies, further improving the playing accuracy of videos in a plurality of columns/a plurality of rows in the first page.

Based on the above-mentioned technical solutions, the video playing method further includes: playing, in a second page and in response to a trigger operation on any fourth target video among the videos in the first page, the fourth target video and all videos arranged after the fourth target video in the first page in a form of video streaming.

Here, the fourth target video refers to any one of videos arranged in rows and columns in the first page, and may be a video being played or a video not being played.

Specifically, if the user performs a trigger operation on any fourth target video in the first page, the video play apparatus switches from the first page to the second page in response to the trigger operation. For example, if the user clicks on a certain fourth target video, the first page is switched to a video detail page corresponding to the fourth target video.

In some embodiments, an in-streaming video consisting of a plurality of videos is included in the second page, and the in-streaming video has the same video content and same video layout as the videos in the first page. Then, after the second page is switched to, the video playing method proceeds to respond to the user's trigger operation to play in the second page the fourth target video and videos arranged after the fourth target video in the first page in the form of video-streaming. Here, the form of video streaming refers to full-screen playing of any video, and with a trigger operation of a user switching videos, the screen switches to play the next video in full screen.

In some embodiments, a video corresponding to the fourth target video is played in the second page. If the video type of the fourth target video is a dynamic cover (a streamlined small video generated based on a key frame of the video content), a detail video (a long video, a complete video, etc.) corresponding to the fourth target video is played from the beginning. If the video type of the fourth target video is a detail video, the video playing method proceeds to play the fourth target video based on the playing progress of the fourth target video before the trigger operation of switching the page.

Based on the above-mentioned technical solution, the video playing method further include, subsequent to the playing, in the second page and in response to a trigger operation on any fourth target video among the videos in the first page, the fourth target video and all videos arranged after the fourth target video in the first page in the form of video streaming: determining, in response to a user triggering a return operation on the first page, a fifth target video that is being played in the second page at the time of triggering the return operation, and locating the fifth target video in the first page for playing.

Specifically, in the process of video playing in the form of video streaming in the second page, if the user triggers a return operation for returning to the first page, the second page switches to the first page, and it needs to determine the video that is being played in the second page (namely, the fifth target video) when the return operation is triggered. The fifth target video in the first page is then located and played. For example, the first page is returned to when the 10th in-streaming video is played in the second page, and the 10th in-streaming video is determined as the fifth target video and is played in the first page. It needs to be noted that if the fifth target video is a dynamic cover, then the dynamic cover is replayed in the first page. If the fifth target video is a detail video, the playing of the fifth target video is continued according to the play progress of the detail video before the return operation. Such a setting realizes the controlled playing of repeatedly playing some videos when the second page where the in-streaming video is located returns to the first page, further improving the dynamic playing control flow of videos in a plurality of columns/a plurality of rows, and further improving the dynamic playing accuracy of videos in the page.

Based on the above-mentioned technical solutions, the video playing method further includes: displaying a third page in response to the user's page switching operation of switching from the first page to the third page; and in response to the user's return operation of returning to the first page, determining a sixth target video that is being played in the first page when the page switching operation is triggered, and locating and playing the sixth target video in the first page.

Here, the third page is a detail page other than a video detail page, such as a user home page, a music detail page, a topic home page, etc.

Specifically, if the user triggers the operation of switching to the third page in the first page, then the following is performed: switching from the first page to the third page and determining a video that is being played in the first page before the page switching operation (i.e. the sixth target video). If a return operation of returning to the first page is triggered in the third page, then the following is performed: switching from the third page to the first page locating the sixth target video, and playing the sixth target video in the first page. If the sixth target video is a dynamic cover, then the dynamic cover is replayed. If the sixth target video is a detail video, the playing of the detail video is continued according to the play progress of the detail video before the return operation. Such a setting realizes the controlled playing of repeatedly playing some videos when the non-video detail page returns to the first page, further improving the dynamic playing control flow of videos in a plurality of columns/a plurality of rows, and further improving the dynamic playing accuracy of videos in the page.

Based on the above-mentioned technical solutions, the video playing method further includes: performing loop playback on the video in the first row and the leftmost column in the first page, or playing videos in the first row in the first page in a polling manner, in response to videos in the first page being arranged from the top of the first page and not detecting a trigger operation.

Specifically, in the case where the videos in the first page being arranged from the top of the first page and the user is not operating after the first page is loaded, in some embodiments, loop playback may be performed on the video in the first row (i.e., the first row) and the leftmost column in the page. For example, in FIG. 2 (a), when the first page is loaded and the user is not operating, loop playback is performed on the video in the first row on the left side. In some other embodiments, videos in the first row are played in a polling manner. For example, in FIG. 2 (a), the video on the left side and the video on the right side are played alternately. Videos being arranged from the top here means that the videos in the first page are arranged from the starting position of the page.

It needs to be noted that in a case where the prompt information for correcting errors in search terms, the recommended and guiding search terms at the top of the search result page when the search terms are too broad, and the like are arranged closest to the starting position of the page, because they do not contain videos, such a case can also be considered as that the videos are arranged from the top. Such a setting can realize the video dynamic playing when the user does not operate, further improving the playing dynamic degree of videos in a plurality of columns/a plurality of rows.

In addition, after the first page is loaded, a time interval (e.g., 1s) may be set to delay the playing of the videos.

In some embodiments, the video playing method further includes: playing in the first page the video in the first row at the rightmost side of the page, or playing in the first page videos in the first row which are not played in a polling manner, in response to the videos in the first page being arranged from the top, detecting a trigger operation, and each video in a next row closest to the first row not reaching the corresponding predetermined control line.

Specifically, in some embodiments, for the case where the videos in the first page are arranged from the top and the user performs a trigger operation, but the magnitude of the video movement caused thereby is not enough to make any video reach its corresponding predetermined control line, the last video in the first row may be played directly. For example, in FIG. 2 (a), the video in the first row on the right side is played. In some other embodiments, the videos in the first row that have not yet been played are played alternately. For example, in the case where the column direction is a vertical direction and the number of columns is two or more, when the first page is loaded and the user is not operating, the leftmost video in the first row is played. When the user slides but does not trigger the control logic of the predetermined control line, the remaining videos in the first row except the leftmost video can be played alternately. Such a setting can realize the video dynamic playing when the user's trigger operation does not trigger the play control logic of the predetermined control line, further improving the playing dynamic degree of videos in a plurality of columns/a plurality of rows.

In some embodiments, the video playing method further includes: playing an arranged-from-the-top hotspot video in response to the first page containing the arranged-from-the-top hotspot video; playing no video in response to the first page containing an arranged-from-the-top comprehensive search result card composed of structured information; or playing in the first page the video in the first row and the leftmost column of the page, in response to the first page containing an arranged-from-the-top hotspot video or an arranged-from-the-top comprehensive search result card composed of structured information and detecting a trigger operation.

The hotspot video is a video for playing a hotspot event content, and is arranged in precedence among the videos at a position closest to the starting position of the page. The comprehensive search result card composed of structured information is composed of multimedia contents of a plurality of types, containing at least videos, and is arranged in preference among the videos at a position closest to the starting position of the page. For example, the search term is "paper-cut", the comprehensive search result card composed of structured information contains a text introduction and a video introduction of paper-cut art, and the videos in a row-column layout contain videos of paper cutting processes of various paper-cut patterns issued by users.

Specifically, taking the slide direction in the vertical direction as an example, when other cards containing videos (such as hotspot videos, comprehensive search result cards composed of structured information, etc.) are present above the videos arranged in rows and columns in the first page, in the case where the first page is loaded and the predetermined control line is not reached, the play control logic of the predetermined control line will not be triggered. Such a setting enables video dynamic playing when videos arranged in rows and columns are not arranged from the top.

For example, in cases where arranged-from-the-top hotspot videos are contained, the video playing apparatus can identify whether hotspot videos are contained in the first page after loading the first page. If a hotspot video is contained, the hotspot video is played without playing any of the videos arranged in rows and columns. For another example, if the video playing apparatus identifies that the loaded first page contains a comprehensive search result card composed of structured information, then the video playing apparatus will not play any of the videos arranged in rows and columns in the first page, avoiding interference with the search main requirements. In another example, if the video playing apparatus identifies a hotspot video or a comprehensive search result card composed of structured information, and detects a trigger operation, the video playing apparatus will play a first video in the first row of the videos arranged in rows and columns before any of the videos arranged in rows and columns reaches its corresponding predetermined control line.

In some embodiments, for the case where the user slides quickly in the first page (the sliding speed is much greater than the response speed), playing control can be performed on the videos according to the above-mentioned control play logic of the predetermined control line; and it is also possible not to play any video, and only when the quick sliding stops, the first target video is determined based on the play control logic of the predetermined control line and played, reducing device performance consumption. In addition, in the above-mentioned play control logic, when a video is played, the playing sound of the video gradually changes from weak to strong.

Figure 5:
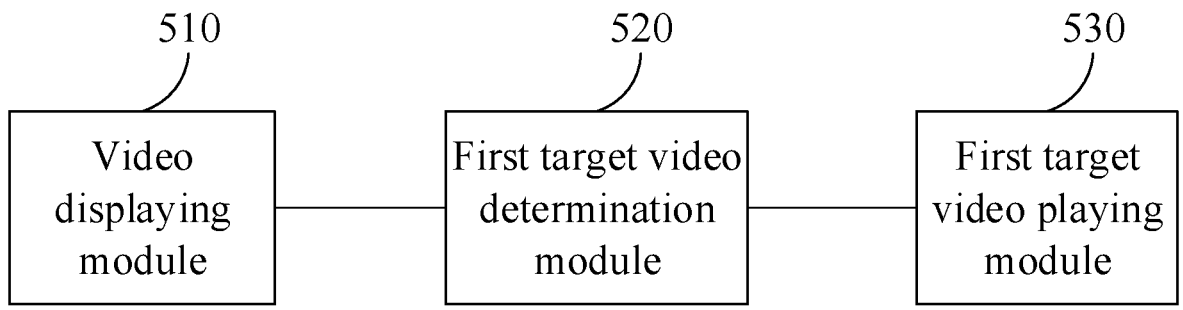
FIG. 5 is a schematic structural diagram of a video playing apparatus provided by an embodiment of the present disclosure.

FIG. 5 is a schematic structural diagram of a video playing apparatus provided by an embodiment of the present disclosure. As shown in FIG. 5, the apparatus includes a video displaying module 510, a first target video determination module 520, and a first target video playing module 530.

The video displaying module 510 is configured to display a plurality of videos in a form of rows and columns in a first page, a column direction being consistent with a slide direction supported by the page.

The first target video determination module 520 is configured to determine a first target video reaching a corresponding predetermined control line of predetermined control lines among videos in a to-be-played row in response to a trigger operation. Here, the predetermined control lines are in correspondence with the columns in the first page, and the predetermined control lines are arranged at intervals along the column direction.

The first target video playing, module 530 is configured to stop playing of a second target video that is being played in the first page, and play the first target video in the first page.

In some embodiments, the first target video determination module 520 includes a play control position determination sub-module, a coincidence determination sub-module, and a first target video determination sub-module.

The play control position determination sub-module is configured to determine a play control position of each of the videos in the to-be-played row based on an operation direction of the trigger operation and a column where the video is located.

The coincidence determination sub-module is configured to determine whether the play control position of each of the videos in the to-be-played row coincides with a predetermined control line corresponding to the video.

The first target video determination sub-module is configured to determine the video with a determination result that the play control position of the video coincides with the predetermined control line corresponding to the video as the first target video.

In some embodiments, the play control position determination sub-module is specifically configured to determine a top edge of each of the videos in the to-be-played row as a play control position of the video when the operation direction of the trigger operation is a forward direction of the slide direction. Here, the forward direction is a direction from an end position of the first page to a starting position of the first page, and the top edge is a side edge of the video adjacent to the starting position, A correspondence between the videos in the to-be-played row and the predetermined control lines is that: videos in the to-be-played row from a left column of the page to a right column of the page sequentially correspond to the predetermined control lines from adjacent to the end position to adjacent to the starting position.

In some embodiments, the play control position determination sub-module is specifically configured to determining, when the operation direction of the trigger operation is a backward direction of the slide direction, a bottom edge of a video in the to-be-played row and the rightmost column of the page as a play control position of the video, and a top edge of each remaining video in the to-be-played row as a play control position of the remaining video. Here, the backward direction is a direction from the starting position of the first page to the end position of the first page, and the bottom edge is a side edge of the video adjacent to the end position.

A correspondence between the videos in the to-be-played row and the predetermined control lines is that: a video in the rightmost column of the page corresponds to a predetermined control line closest to the end position; the remaining videos from a left column of the page to a right column of the page sequentially correspond to remaining predetermined control lines of the predetermined control lines from adjacent to the end position to adjacent to the starting position.

In some embodiments, the first target video playing module 530 is specifically configured to play, when the at least one first target video includes one, the one first target video in the first page; and determine, when the at least one first target video includes a plurality of first target videos, a last first target video among the plurality of first target videos in an opposite direction of the operation direction based on the operation direction of the trigger operation, and play the determined first target video in the first page.

In some embodiments, the apparatus further includes a third target video playing module configured to determine a third target video reaching a corresponding predetermined control line among the videos in response to another trigger operation after stopping playing of a second target video that is being played in the first page and playing the first target video in the first page; and stop the playing of the first target video and play the third target video in the first page.

In some embodiments, the apparatus further includes a fourth target video playing module configured to play, in a second page and in response to a trigger operation on any fourth target video among the videos in the first page, the fourth target video and all videos arranged after the fourth target video in the first page in a form of video streaming.

In some embodiments, the apparatus further includes a fifth target video playing module configured to, after playing, in the second page and in response to the trigger operation on any fourth target video among the videos in the first page, the fourth target video and all videos arranged after the fourth target video in the first page in the form of video streaming: determine, in response to a user triggering a return operation on the first page, a fifth target video that is being played in the second page at the time of triggering the return operation, and locate the fifth target video in the first page for playing.

In some embodiments, the video displaying device 510 is specifically configured to receive video search information of a user; determine a plurality of videos corresponding to the video search information; and play the plurality of videos in the form of rows and columns in the first page.

In some embodiments, when the columns are two columns, the predetermined control lines include a first predetermined control line adjacent to the starting position of the first page and a second predetermined control line adjacent to the end position of the first page.

When an operation direction of the trigger operation is a forward direction of the slide direction, the first predetermined control line corresponds to the right column of the page, and the second predetermined control line corresponds to the left column of the page.

When the operation direction of the trigger operation is a backward direction of the slide direction, the first predetermined control line corresponds to the left column of the page, and the second predetermined control line corresponds to the right column of the page.

In some embodiments, positions of the predetermined control lines in the first page are determined based on video lengths of the videos in the column direction and a length of the first page in the column direction.

By means of the video playing apparatus provided by the embodiments of the present disclosure, the followings are achieved: a plurality of predetermined control lines is set in the page in advance, and in the trigger operation process, these predetermined control lines are constantly used to respectively control the playing and stopping of videos in a row perpendicular to the slide direction, which improves the accuracy of the control of the playing and stopping of each video in the dynamic presentation process of a plurality of columns of videos, and solves the problem of the playing chaos of a plurality of columns of videos, the problem that the area where the video is being played cannot be positioned in a suitable visual area in the screen, the problem that the user operation causes the mis-playing of non-target videos, etc., thereby improving the user experience.

The video playing apparatus provided by the embodiments of the present disclosure can execute the video playing method provided in any embodiment of the present disclosure, and has corresponding functional modules and advantageous effects of executing the method.

It is worth noting that in the above-mentioned embodiments of the video playing apparatus, various modules and sub-modules included therein are merely divided according to functional logic, but are not limited to the above-mentioned division, as long as corresponding functions can be realized; in addition, the specific names of various functional modules/sub-modules are merely for facilitating mutual distinction, and are not intended to limit the scope of the present disclosure.

Figure 6:
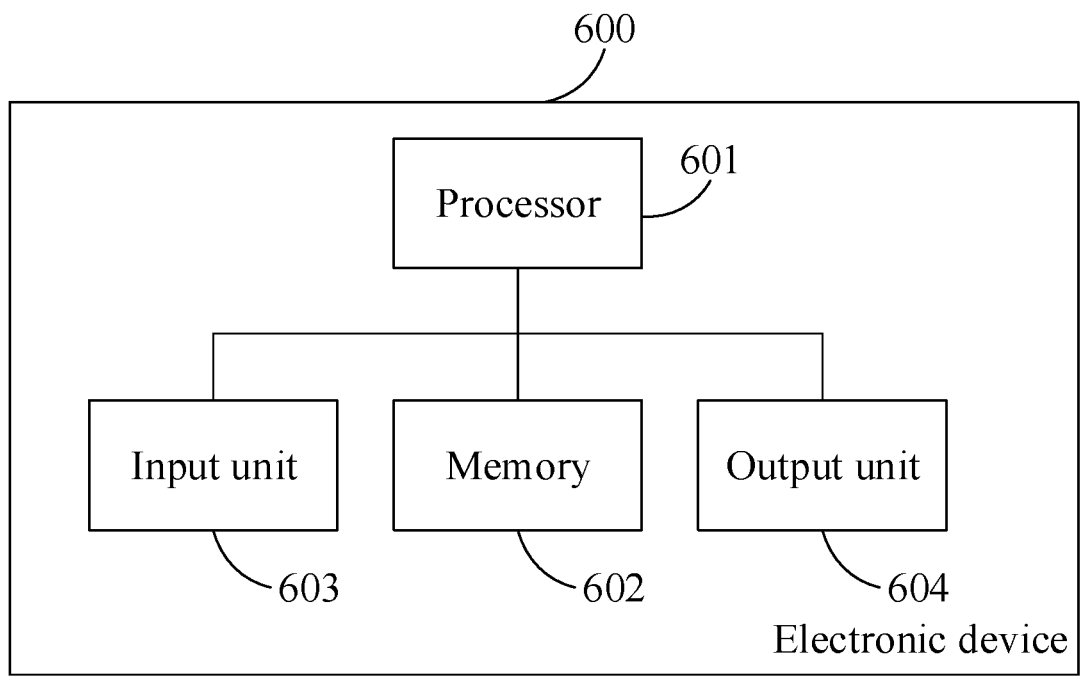
FIG. 6 is a schematic structural diagram of an electronic device provided by an embodiment of the present disclosure.

FIG. 6 is a schematic structural diagram of an electronic device provided by an embodiment of the present disclosure. As shown in FIG. 6, an electronic device 600 includes one or more processors 601 and a memory 602.

The processor 601 may be a central processing unit (CPU) or other forms of processing units having data processing capabilities and/or instruction execution capabilities, and may control other components in the electronic device 600 to perform desired functions.

The memory 602 may include one or more computer program products, which may include various forms of computer-readable storage media, such as volatile memory and/or non-volatile memory. The volatile memory may include, for example, random-access memory (RAM) and/or cache memory (cache), etc. The non-volatile memory may include, for example, a read-only memory (ROM), a hard disk, a flash memory, etc. One or more computer program instructions may be stored in a computer-readable storage medium, and the processor 601 may run the program instructions to implement the video playing method of the embodiments of the present disclosure described above and/or other desired functions. Various contents such as videos, predetermined control lines, etc. may also be stored in the computer-readable storage medium.

In one example, the electronic device 600 may further include: an input unit 603 and an output unit 604. These components are interconnected through a bus system and/or other forms of connecting mechanisms (not shown). The input unit 603 may include, for example, a keyboard, a mouse, etc. The output unit 604 may output various information, including target videos, detail videos, etc. The output unit 604 may include, for example, displays, speakers, printers, and communication networks and remote output units connected thereto, etc.

Of course, for simplicity, in FIG. 6, only some components in the electronic device 600 related to the present disclosure are shown, and components such as buses, input/output interfaces, etc. are omitted. In addition, the electronic device 600 may further include any other suitable components, depending on the particular application.

In addition to the method and apparatus described above, an embodiment of the present disclosure may be a computer program product comprising computer program instructions which, when executed by a processor, cause the processor to perform the steps of the video playing method provided by the embodiments of the present disclosure.

The computer program product may write program codes for executing operations of embodiments of the present disclosure in any combination of one or more programming languages, including object-oriented programming languages, such as Java, C++, etc., and conventional procedural programming languages, such as the "C" language or similar programming languages. The program codes can be completely executed on user computing devices, partially executed on user devices, executed as one standalone software package, partially executed on user computing devices and partially executed on remote computing devices, or completely executed on remote computing devices or servers.

In addition, an embodiment of the present disclosure may be a computer-readable storage medium having computer program instructions stored thereon. The computer program instructions, when executed by a processor, cause the processor to execute the steps of the video playing method provided in the embodiments of the present disclosure.

The computer-readable storage medium may be any combination of one or more readable media. The readable medium may be a readable signal medium or a readable storage medium. The readable storage medium can include, for example, but is not limited to, electronic, magnetic, optical, electromagnetic, infrared, or semiconductor system, apparatus, or device, or any combination thereof. More specific examples of readable storage media (non-exhaustive list) include: electrical connection with one or more wires, portable disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the above.

It needs to be noted that the terms used in this disclosure are only intended to describe specific embodiments and not to limit the scope of the present application. As shown in the description and claims of this disclosure, unless exceptions are clearly indicated, the words such as "a", "one", "an", and/or "the" may not specifically refer to the singular form but may also include the plural form. The term 'and/or' includes any one and all combinations of one or more related listed items. The terms "comprise", "include", or any other variation thereof, are intended to cover a non-exclusive inclusion, such that a process, a method, or equipment that comprises a list of elements not only includes those elements but also includes other elements not expressly listed or elements inherent to such process, method, or equipment. The relational terms such as "first", "second", and the like are merely intended to distinguish one entity or operation from another entity or operation without necessarily requiring or implying any such actual relationship or order between such entities or operations. Without more constraints, an element defined by the phrase "including one" does not preclude the existence of additional identical elements in the process, method, or equipment that includes the element.

The above are merely specific implementations of the present disclosure, which enables those skilled in the art to understand or implement the present disclosure. Various modifications to these embodiments will be readily apparent to those skilled in the art, and the generic principles defined herein may be implemented in other embodiments without departing from the ideas or scope of the present disclosure. Therefore, the present disclosure is not to be limited to the embodiments described herein, but is to be accorded with the widest scope consistent with the principles and novel features disclosed herein.

What is claimed is:

1. A video playing method, comprising:
displaying a plurality of videos in a form of rows and columns in a first page, a column direction being consistent with a slide direction supported by the page, and each of the number of the rows and the number of the columns being not smaller than 2;
determining, in response to a trigger operation, at least one first target video reaching a corresponding predetermined control line of predetermined control lines among videos in a to-be-played row, the predetermined control lines being in one-to-one correspondence with the columns in the first page, the predetermined control lines being arranged at intervals along the column direction, and the number of the predetermined control lines is the same as the number of the columns; and
stopping playing of a second target video that is being played in the first page, and playing the at least one first target video in the first page,
wherein when the columns are two columns, the predetermined control lines comprise a first predetermined control line adjacent to a starting position of the first page and a second predetermined control line adjacent to an end position of the first page, wherein:
when an operation direction of the trigger operation is a forward direction of the slide direction, the first predetermined control line corresponds to a right column of the page, and the second predetermined control line corresponds to a left column of the page; and
when the operation direction of the trigger operation is a backward direction of the slide direction, the first predetermined control line corresponds to the left column of the page, and the second predetermined control line corresponds to the right column of the page.

2. The method according to claim 1, wherein said determining, in response to the trigger operation, the at least one first target video reaching the corresponding predetermined control line of the predetermined control lines among the videos in the to-be-played row comprises:
determining, based on an operation direction of the trigger operation and a column where each of the videos in the to-be-played row is located, a play control position of the video;
determining whether the play control position of each of the videos in the to-be-played row coincides with a predetermined control line corresponding to the video; and
determining the video with a determination result that the play control position of the video coincides with the predetermined control line corresponding to the video as the at least one first target video.

3. The method according to claim 2, wherein said determining, based on the operation direction of the trigger operation and the column where each of the videos in the to-be-played row is located, the play control position of the video comprises:
  determining a top edge of each of the videos in the to-be-played row as a play control position of the video when the operation direction of the trigger operation is a forward direction of the slide direction, wherein the forward direction is a direction from an end position of the first page to a starting position of the first page, and the top edge is a side edge of the video adjacent to the starting position,
  wherein a correspondence between the videos in the to-be-played row and the predetermined control lines is that: the videos in the to-be-played row from a left column of the page to a right column of the page sequentially correspond to the predetermined control lines from adjacent to the end position to adjacent to the starting position.

4. The method according to claim 2, wherein said determining, based on the operation direction of the trigger operation and the column where each of the videos in the to-be-played row is located, the play control position of the video comprises:
  when the operation direction of the trigger operation is a backward direction of the slide direction, determining a bottom edge of a video in the to-be-played row and a rightmost column of the page as a play control position of the video, and determining a top edge of each remaining video in the to-be-played row as a play control position of the remaining video, wherein the backward direction is a direction from a starting position of the first page to an end position of the first page, and the bottom edge is a side edge of the video adjacent to the end position,
  wherein a correspondence between the videos in the to-be-played row and the predetermined control lines is that: a video in the rightmost column of the page corresponds to a predetermined control line closest to the end position; and remaining video from a left column of the page to a right column of the page sequentially correspond to remaining predetermined control lines from adjacent to the end position to adjacent to the starting position.

5. The method according to claim 1, wherein said playing the at least one first target video in the first page comprises:
  playing, when the at least one first target video comprises one first target video, the one first target video in the first page; and
  determining, when the at least one first target video comprises a plurality of first target videos, a last first target video among the plurality of first target videos in an opposite direction of the operation direction based on an operation direction of the trigger operation, and playing the determined first target video in the first page.

6. The method according to claim 1, further comprising, subsequent to said stopping playing of the second target video that is being played in the first page, and playing the at least one first target video in the first page:
  determining a third target video reaching a corresponding predetermined control line among the videos in response to another trigger operation; and
  stopping the playing of the at least one first target video, and playing the third target video in the first page.

7. The method according to claim 1, further comprising:
  playing, in a second page and in response to a trigger operation on any fourth target video among the videos in the first page, the fourth target video and all videos arranged after the fourth target video in the first page in a form of video streaming.

8. The method according to claim 7, further comprising, subsequent to said playing, in the second page and in response to the trigger operation on any fourth target video among the videos in the first page, the fourth target video and all videos arranged after the fourth target video in the first page in a form of video streaming:
  determining, in response to a user triggering a return operation on the first page, a fifth target video that is being played in the second page at the time of triggering the return operation, and locating the fifth target video in the first page for playing.

9. The method according to claim 1, wherein said displaying the plurality of videos in a form of rows and columns in the first page comprises:
  receiving video search information of a user;
  determining a plurality of videos corresponding to the video search information; and
  playing the plurality of videos in the form of rows and columns in the first page.

10. The method according to claim 1, wherein positions of the predetermined control lines in the first page are determined based on video lengths of the videos in the column direction and a length of the first page in the column direction.

11. An electronic device, comprising:
  a processor; and
  a memory, having a program or instruction stored thereon, wherein the program or instruction, when executed by the processor, causes the processor to:
  display a plurality of videos in a form of rows and columns in a first page, a column direction being consistent with a slide direction supported by the page, and each of the number of the rows and the number of the columns being not smaller than 2;
  determine, in response to a trigger operation, at least one first target video reaching a corresponding predetermined control line of predetermined control lines among videos in a to-be-played row, the predetermined control lines being in one-to-one correspondence with the columns in the first page, the predetermined control lines being arranged at intervals along the column direction, and the number of the predetermined control lines is the same as the number of the columns; and
  stop playing of a second target video that is being played in the first page, and play the at least one first target video in the first page,
  wherein when the columns are two columns, the predetermined control lines comprise a first predetermined control line adjacent to a starting position of the first page and a second predetermined control line adjacent to an end position of the first page, wherein:
  when an operation direction of the trigger operation is a forward direction of the slide direction, the first predetermined control line corresponds to a right column of the page, and the second predetermined control line corresponds to a left column of the page; and
  when the operation direction of the trigger operation is a backward direction of the slide direction, the first predetermined control line corresponds to the left column of the page, and the second predetermined control line corresponds to the right column of the page.

12. The electronic device according to claim 11, wherein the program or instruction, when executed by the processor, further causes the processor to:

determine, based on an operation direction of the trigger operation and a column where each of the videos in the to-be-played row is located, a play control position of the video;
determine whether the play control position of each of the videos in the to-be-played row coincides with a predetermined control line corresponding to the video; and
determine the video with a determination result that the play control position of the video coincides with the predetermined control line corresponding to the video as the at least one first target video.

13. The electronic device according to claim 12, wherein the program or instruction, when executed by the processor, further causes the processor to:
determine a top edge of each of the videos in the to-be-played row as a play control position of the video when the operation direction of the trigger operation is a forward direction of the slide direction, wherein the forward direction is a direction from an end position of the first page to a starting position of the first page, and the top edge is a side edge of the video adjacent to the starting position,
wherein a correspondence between the videos in the to-be-played row and the predetermined control lines is that: the videos in the to-be-played row from a left column of the page to a right column of the page sequentially correspond to the predetermined control lines from adjacent to the end position to adjacent to the starting position.

14. The electronic device according to claim 12, wherein the program or instruction, when executed by the processor, further causes the processor to:
when the operation direction of the trigger operation is a backward direction of the slide direction, determine a bottom edge of a video in the to-be-played row and a rightmost column of the page as a play control position of the video, and determine a top edge of each remaining video in the to-be-played row as a play control position of the remaining video, wherein the backward direction is a direction from a starting position of the first page to an end position of the first page, and the bottom edge is a side edge of the video adjacent to the end position,
wherein a correspondence between the videos in the to-be-played row and the predetermined control lines is that: a video in the rightmost column of the page corresponds to a predetermined control line closest to the end position; and remaining video from a left column of the page to a right column of the page sequentially correspond to remaining predetermined control lines from adjacent to the end position to adjacent to the starting position.

15. The electronic device according to claim 11, wherein the program or instruction, when executed by the processor, further causes the processor to:
play, when the at least one first target video comprises one first target video, the one first target video in the first page; and
determine, when the at least one first target video comprises a plurality of first target videos, a last first target video among the plurality of first target videos in an opposite direction of the operation direction based on an operation direction of the trigger operation, and play the determined first target video in the first page.

16. The electronic device according to claim 11, wherein the program or instruction, when executed by the processor, further causes the processor to, subsequent to said stopping playing of the second target video that is being played in the first page, and playing the at least one first target video in the first page:
determine a third target video reaching a corresponding predetermined control line among the videos in response to another trigger operation; and
stop the playing of the at least one first target video, and play the third target video in the first page.

17. The electronic device according to claim 11, wherein the program or instruction, when executed by the processor, further causes the processor to:
play, in a second page and in response to a trigger operation on any fourth target video among the videos in the first page, the fourth target video and all videos arranged after the fourth target video in the first page in a form of video streaming.

18. The electronic device according to claim 17, wherein the program or instruction, when executed by the processor, further causes the processor to, subsequent to said playing, in the second page and in response to the trigger operation on any fourth target video among the videos in the first page, the fourth target video and all videos arranged after the fourth target video in the first page in a form of video streaming:
determine, in response to a user triggering a return operation on the first page, a fifth target video that is being played in the second page at the time of triggering the return operation, and locate the fifth target video in the first page for playing.

19. A non-transitory computer-readable storage medium having a program or instruction stored therein, wherein the program or instruction is configured to cause a computer to execute steps of the method according to claim 1.

* * * * *